United States Patent
Lohrer

[15] 3,685,112
[45] Aug. 22, 1972

[54] GEARLIKE TOOL WITH HELICALLY ARRANGED GROOVES

[72] Inventor: Josef Lohrer, Munich, Germany

[73] Assignee: Hurth Carl Maschinen-und Zahnradfabrik, Munich, Germany

[22] Filed: Feb. 18, 1971

[21] Appl. No.: 116,316

[30] Foreign Application Priority Data

April 24, 1970 Germany..........P 20 19 873.6

[52] U.S. Cl. ...............................29/103 C, 90/1.6 A
[51] Int. Cl. .............................................B26d 1/12
[58] Field of Search ..........29/103 C; 90/1.6 A, 1.6 R

[56] References Cited

UNITED STATES PATENTS 3,208,128  9/1965  Grandi et al. .............29/103 C
3,182,557  5/1965  Hurth .......................90/1.6 A
3,169,447  2/1965  Hurth .......................90/1.6 A Primary Examiner—Leonidas Vlachos
Attorney—Woodhams, Blanchard and Flynn

[57] ABSTRACT

A gearlike tool adapted for working a gear by rolling. The tooth surfaces of said tool are provided with grooves for forming cutting edges. Said grooves are offset axially along a section of a helix, which section when axially measured comprises a groove pitch or multiple thereof plus or minus a selected amount and is equal to the amount of groove offset from one tooth to the next of the workpiece multiplied by the number of such teeth. Further, said length is of a value other than that of the selected amount and the entire number of teeth of the tool is an integral multiple of the groove pitch divided by the groove offsets from one tooth to the next.

6 Claims, 15 Drawing Figures

PATENTED AUG 22 1972

Inventor:
JOSEF LOHRER
BY Woodhams, Blanchard & Flynn
ATTORNEYS

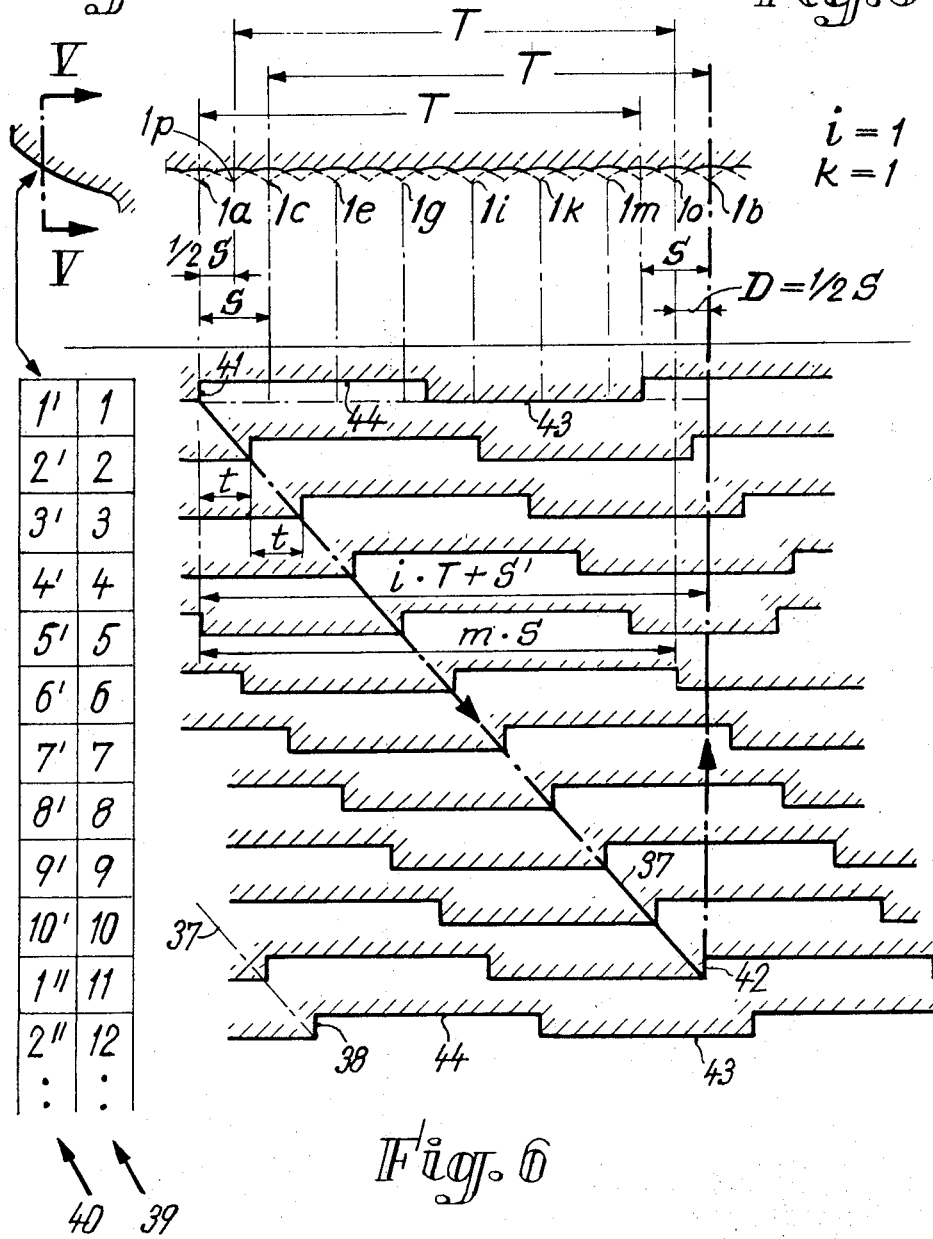

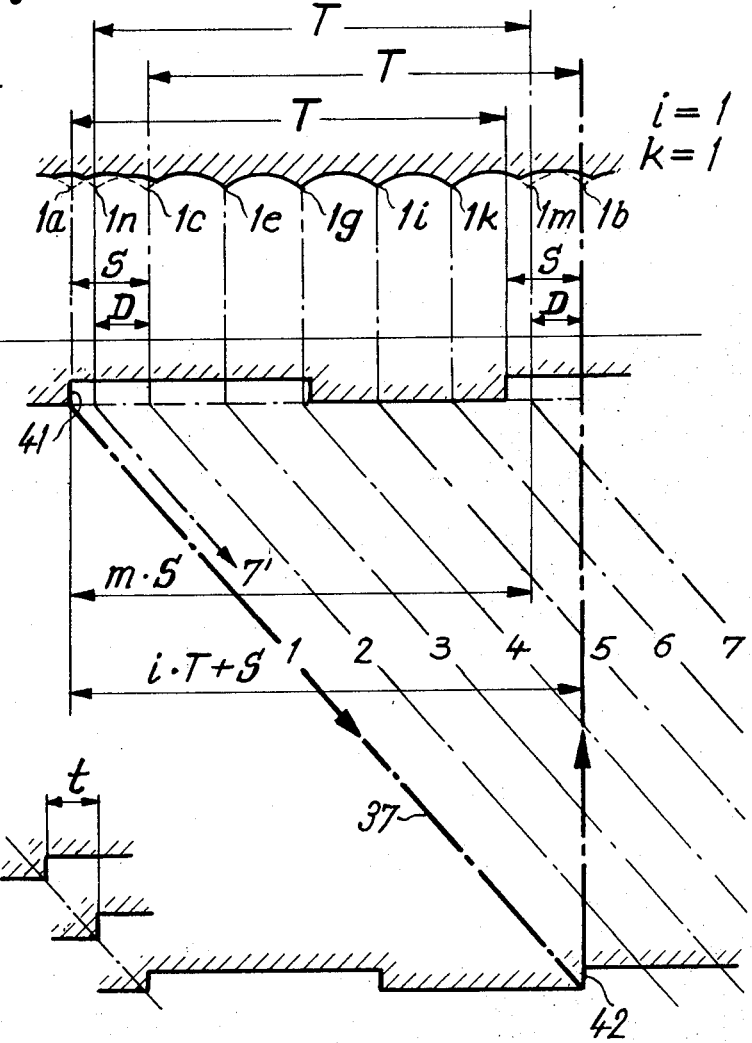

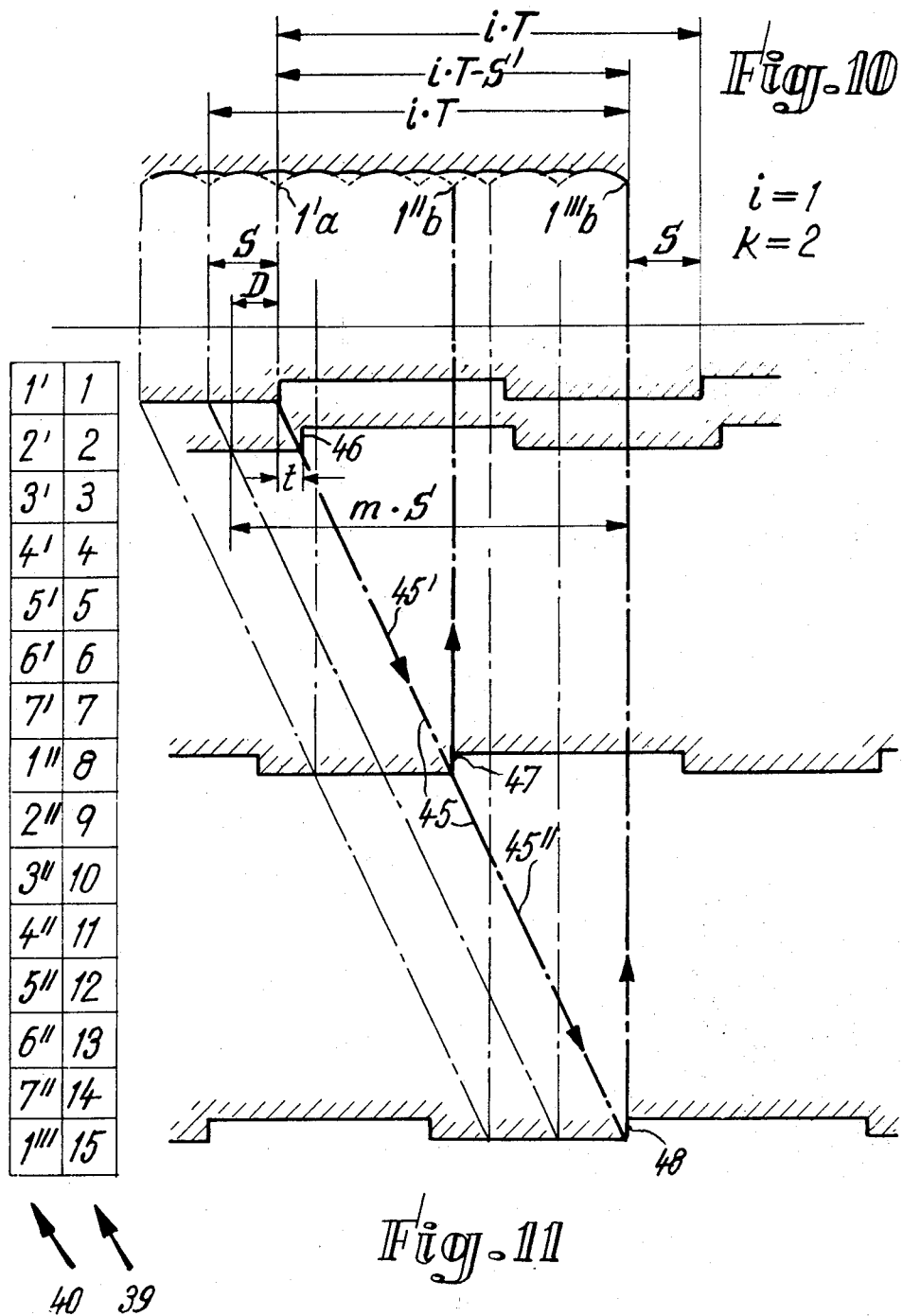

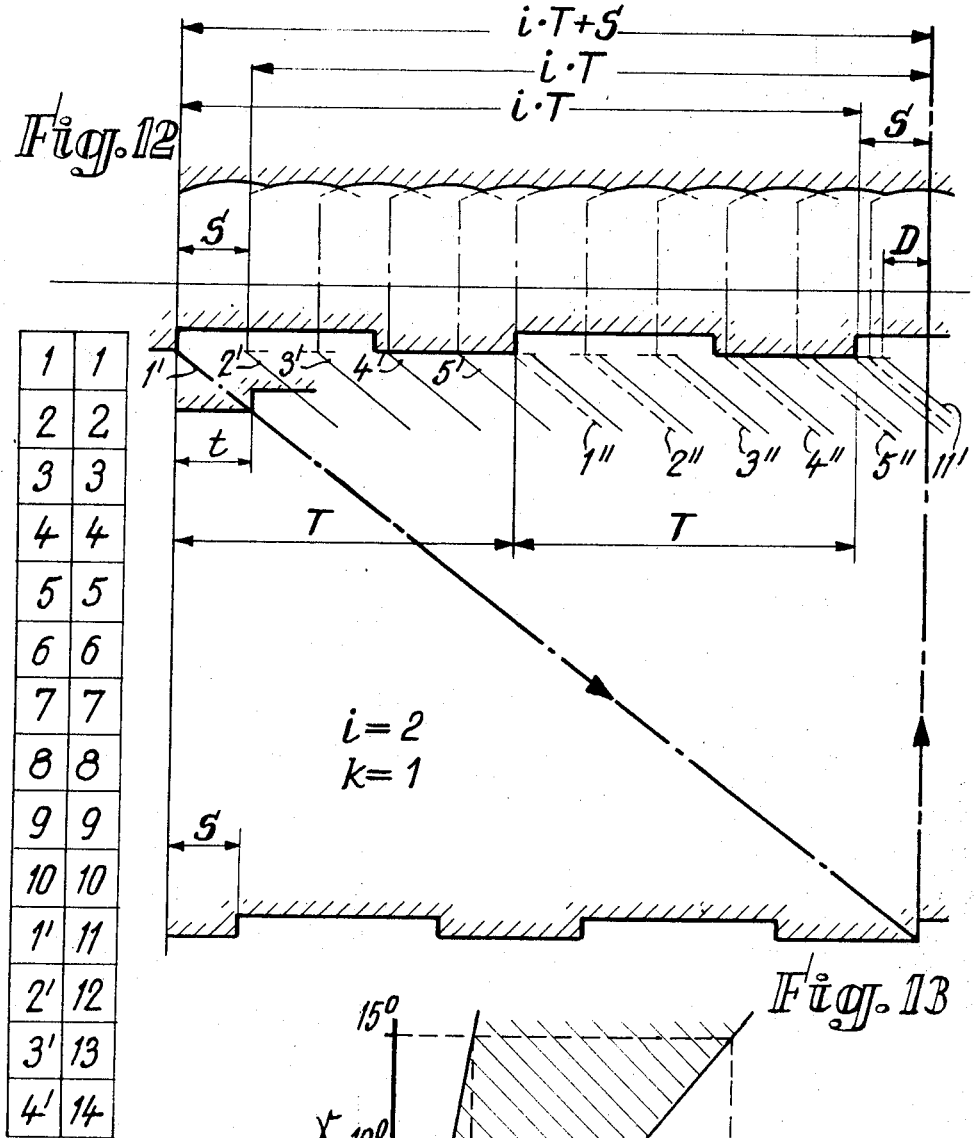
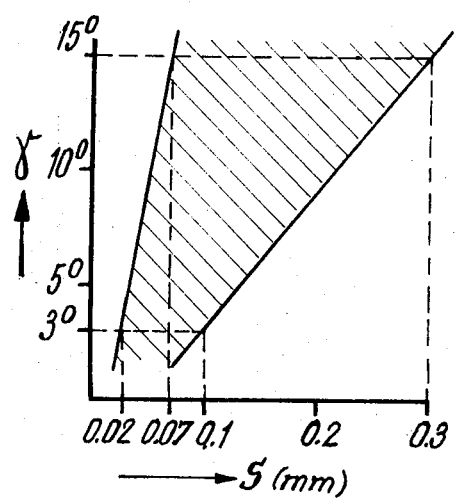

GEARLIKE TOOL WITH HELICALLY ARRANGED GROOVES

This invention relates to a gearlike tool which is suitable for working of a selected gear by rolling. The tooth surfaces of said tool are provided with a plurality of edge forming grooves, which grooves are arranged along helical curves having a lead equal to one groove pitch, or an integral multiple thereof, on the successive teeth.

It is already known to provide a rotary gear shaving cutter with cutting edges which are helically arranged on the successive teeth and in which the helical curves or spirals formed by the cutting edges have multiple starts, thus are arranged multi-threaded. In such a rotary gear shaving cutter, the number of teeth from one flute start to the next (group teeth count) in an integer. Such an arrangement has the disadvantage that the cutting edges work always the same surface parts and thus create a certain ripple of the surface which depends on the distance (measured parallel to the longitudinal extension of the teeth) of the cutting edges from the next equally positioned cutting edge of the adjacent tooth. The number of teeth in known rotary gear shaving cutters is an integral multiple of the group teeth count through which, since as a practical matter for the outside diameter of the rotary gear shaving cutters only certain smallest and largest dimensions are possible, only limited design possibilities are available.

The invention has the purpose of avoiding this ripple and to make same practically disappear in a further development of the invention; or, differently expressed, the surface quality of the workpiece tooth surface is to be improved. Also it is a purpose of the invention to use rotary gear shaving cutters of equal number of teeth for different workpiece tooth numbers which is not easily possible with the known rotary gear shaving cutters.

The basic purpose of the invention is attained by providing tool teeth having cutting edges forming grooves which are arranged along helical curves, an axially defined portion thereof defines a groove pitch, or an integral multiple thereof with the addition or subtraction of an incremental value defined according to a number of individual steps of said edges from such tooth to tool tooth, which number corresponds to the number of workpiece teeth or an integral multiple thereof. Further, said portion is not an integral multiple of said amount and the entire number of teeth of the tool is an integral multiple of the pitch divided by the individual steps from tool tooth to tool tooth. This thought can be differentiated. Thus the invention can be further developed in such a manner that a sum of the amounts differs from the axially defined section by a difference amount which evenly divides into the amount. With a tool constructed in such a manner one or more rows of cuts are placed between the first row of cuts whereby the width of the waves and the amplitude of the waves are reduced.

According to a different embodiment of the invention, the tool is constructed in such a manner that a sum of the incremental values differs from the above defined axial portions by a difference amount which does not evenly divide into the incremental value. With such a tool the edges do not contact a workpiece surface part for a second time during any normally occurring number of workpiece revolutions. Thus, an optimum tooth surface is obtained.

According to a different characteristic of the last described embodiment of the invention, the tool is constructed in such a manner that the quotient of the number of tool teeth and number of the starts of said helical curves are not an integer. For the surface quality which is produced by the rotary gear shaving cutter the size of the above-mentioned amount is of decisive importance at which during rolling of the rotary gear shaving cutter on the workpiece one groove pitch or one integral multiple thereof is exceeded or is diminished after a certain number of individual steps (from tooth to tooth). According to the invention the rotary gear shaving cutter is constructed in such a manner that the amount is smaller than the cutting traces, the width of which depends on the size of the crossed-axes angle and the longitudinal slide resulting therefrom. Optimum surface qualities are obtained when the rotary gear shaving cutter of the invention is constructed in such a manner that the amount is at a crossed-axes angle $\gamma$ of $3° = 0.02$ to $0.10$ mm. and at $15° = 0.07$ to $0.3$ mm. and that the intermediate or connecting values are interpolated or extrapolated. The smaller values are suitable for small numbers of workpiece teeth.

Further advantages and characteristics of the invention are disclosed in the following description.

The invention is explained in connection with FIGS. 1 to 15.

FIG. 4 is a cross-sectional view of a workpiece tooth parallel to the face.

FIG. 5 is a cross-sectional view of a tooth surface of a workpiece along the line V—V of FIG. 4.

FIG. 6 illustrates rolled-out schematically the teeth of a tool according to the invention, namely only one flank each along the line VI—VI of FIG. 3.

FIG. 7 is a cross-sectional view of a workpiece tooth parallel to the face.

FIG. 8 is a cross-sectional view of a tooth surface of a workpiece along the line VIII—VIII of FIG. 7.

FIG. 9 illustrates rolled-out schematically the teeth of a tool in a similar illustration as in FIG. 6 (cross section along the line VI—VI). However, only the surfaces of some tool teeth are illustrated, but the helical curves formed by the groove edges are shown.

FIG. 10 is a cross-sectional view of a tooth surface of a workpiece along the line VIII—VIII of FIG. 7.

FIG. 11 illustrates rolled-out schematically the teeth of a tool in a similar illustration as in FIG. 9, namely only a few of the tooth surfaces are illustrated, but the helical curves formed by the groove edges are shown.

FIG. 12 is a cross-sectional view of a workpiece tooth surface along the line VIII—VIII of FIG. 7.

FIG. 13 illustrates rolled-out schematically the teeth of a rotary gear shaving cutter similar to the illustrations in FIGS. 6, 9 and 11.

FIG. 15 illustrates the dependency according to the invention between the crossed-axes angle during shaving and the amount S.

In order to make the understanding of the following description easier, a definition of the designations and symbols is first given:

$Z_1$ = number of teeth of the workpiece
$Z_2$ = number of teeth of the tool
$Z_G$ = group teeth count
$T$ = groove pitch
$t$ = edge steps = distance (measured parallel to the longitudinal extension of the teeth) of one edge from the next similarly positioned offsetted edge of the adjacent tooth
$S$ = amount = selected feed or distance of the edges which become effective on the same workpiece tooth surface due to the helical arrangement of the grooves. This distance must, during shaving, be covered by the width of the shaving chips.
$i$ = integer factor of T
$k$ = integral number = number of rotations of the workpiece which are required so that a sum of edge steps $t$ results in the section $i \cdot T \pm S$
$m$ = integer factor with which S must be multiplied in order to exceed or be less than the section $i \cdot T \pm S$ with a difference amount whereby this difference amount is smaller than S
$n$ = integer factor which, multiplied with the groove pitch T, results in the lead of the helical curve of the cutting grooves = number of starts
$D$ = difference amount $(.T \pm S) - m \cdot S$
$o$ = integral number.

Then the following relations are valid:

$$i \cdot T \pm S = K \cdot Z_1 \cdot t \text{ (section of length)}$$

$$n \cdot T = Z_2 \cdot t \quad \text{or}$$

$$Z_2 = n \cdot T/t$$

Furthermore according to the invention the following conditions are valid:

$$O \cdot t \neq T$$

or $$\frac{S}{(iT \pm S) - m.S} = \text{any desired number (for example 2, Figure 6)}$$

or $$\frac{S}{(iT \pm S) - m.S} = \text{no integral number}$$

$$Z_G = Z_2/n = \text{no integral number}$$

Numbers 1 to 30 are no reference numbers but ordinal numbers, for example, for identifying the sequence of the teeth.

Figure 1:
FIG. 1 is a schematically illustrated side view of the engagement of a rotary gear shaving cutter with a workpiece.
Figure 2:
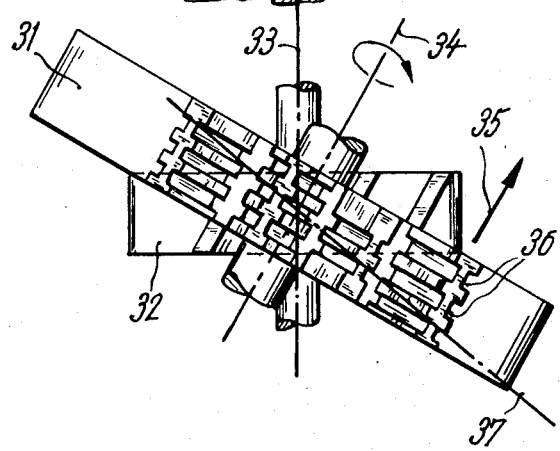
FIG. 2 illustrates the elements of FIG. 1.

FIGS. 1 and 2 illustrate schematically the engagement of a rotary gear shaving cutter 31 with a gear 32 which is to be worked by the rotary gear shaving cutter. The axes 33, 34 about which the elements rotate are crossed which causes during the rolling a longitudinal sliding for example in direction of the arrow 35 of the rotary gear shaving cutter tooth surface relative to the gear tooth surface. The teeth of the rotary gear shaving cutter are provided with a plurality of grooves 36 on the surfaces, the walls of which grooves form cutting edges with the surfaces which cutting edges remove shavings (chips) due to the longitudinal sliding thereof. By this arrangement, effective protruding flank parts 43 and ineffective recessed flank parts 44 are formed. These grooves are not illustrated in FIG. 1 but they are illustrated in FIG. 2 and by means of dashes in FIG. 3. A longitudinal feed of the tool relative to the gear is not here intended (plunge shaving). In order to assure that the cutting edges of all tool teeth do not always work certain flank parts of the gear and other parts not at all, the cutting edges are arranged offset on the successive teeth following helical curves 37.

Figure 3:
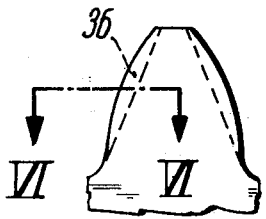
FIG. 3 is a front view of a tooth of a rotary gear shaving cutter.

Only one surface of each tooth is illustrated according to the line VI—VI of FIG. 3. The equally positioned edges are spaced at a distance T (pitch) from one another on the same flank. The corresponding grooves on successive teeth are arranged following helical curves 37 so that the edges of the next equally positioned edges of each adjacent tooth, measured in direction of the longitudinal extension of the tooth has a distance $t$ which will be called "edge step" hereinafter. The teeth of the rotary gear shaving cutter are identified with 1 to 12 in column 39 (compare also FIG. 1). The teeth of the rotary gear shaving cutter roll on a gear which has, for example, 10 teeth. These teeth are identified with 1' to 10' in the column 40 for the first rotation of the workpiece gear and with 1", 2"... for the next rotation. FIG. 5 illustrates a longitudinal cross-sectional view of the surface of a gear tooth along the line V—V of FIG. 4 which is a cross section parallel to the face of the workpiece gear. The cutting sequence on this tooth surface will be described hereinafter.

The inclination of the helical curves 37, or differently expressed, the size of the edge steps is chosen according to the invention in such a manner that after a number of workpiece teeth, or differently expressed, after a number of edge steps, the edges have covered the pitch $T$ or an integral multiple thereof $\cdot T$ plus a selected amount $S$, thus $(T + S)$ or $(i \cdot T + S)$. In the example the factor $i = 1$ so that $i \cdot T + S = T + S$. Thus when the edge 41 of the rotary gear shaving cutter 1 has made the cut 1a on the workpiece tooth surface 1', then the edge 42 of the rotary gear shaving cutter 11 removes on the same tooth surface — since a new rotation of the workpiece starts identified with 1"— at the point 1b a chip. Both cuts are spaced from one another at $i \cdot T + S$ (with $i = 1$). The cutting edges are spaced from one another on the same surface at the amount of the cutting groove division $T$. thus simultaneously with the cut 1b, a cut 1c is also made. The cuts 1a and 1c are spaced apart at the chosen amount S. During a further rolling, starting from 1c, as described above, a further cut which is not illustrated (which would have to be identified with [1d]) is obtained in the distance $(i \cdot T + S)$ to the right of 1c, in the distance S to the right of 1b. At a division T to the left thereof, the cut 1e which is spaced from 1c at the amount S is obtained. Thus with each distance S a series of $m$ cuts is obtained which are identified with 1a, 1c, 1e, 1g, 1i, 1k, 1m and 1o. (The reference numerals 1d, 1f, etc. lying therebetween would identify the cuts positioned to the right of 1b which cuts are not illustrated.) If the cut 1o would meet 1b, the cuts of the second passage 1", 2"... would fall on the cuts of the first series. This would occur, for example, if $(i \cdot T \pm S)$ would be an integral multiple of the amount S.

However, according to the invention $(i \cdot T \pm S)$ is not an integral multiple of S, thus $i \cdot T \pm S = m \cdot S$.

The distance 1a to 1o equal $(m \cdot S)$ and section of length $(i \cdot T \pm S)$, in the example $(i \cdot T \pm S)$ differs from one another at the difference $D$. $D = 1/2S$ is chosen in the exemplary embodiment. Through this, for example the cutting edge which is spaced from the cut $1o$ at a pitch $T$ intersects exactly between the two cuts $1a$ and $1c$ (identified with $1p$). Starting from here, again a series of cuts is created (not here identified) which lie between the cuts $1a$ to $1o$.

In gear shaving the chip width is, according to the invention, preferably at least equal to the amount $S$. The crossed-axes angle must be chosen according to the invention accordingly for which FIG. 15 given an example, or conversely, the amount $S$ must be chosen according to the crossed-axes angle. The workpiece tooth surface would actually be finished after the first passage $1a$ to $1o$. The feed markings (that is, the markings created by the sequence of the chip removals) are, however, still relatively large and become larger if the cuts of the different series repeatedly meet. Due to the fact that a second series of cuts $1p$ . . . and subsequent series are positioned between the preceding series, the feed markings become smaller and the ripple is reduced.

From the above teaching, the tooth count is not an integral number from one start of the helical curve formed by the edges to the start of the next helical curve (group teeth count $Z_G$).

FIGS. 7 to 9 illustrate a different exemplary embodiment of the invention. FIG. 9 differs from FIG. 6 as only in that part of the tool surfaces are illustrated and the illustration is limited to the helical curves formed by the edges 41, 42. The number of teeth of the workpiece is the same as in the preceding example. The first cut with the edge 41 on the surface of the tooth $1'$ is identified with $1a$. Then after the first rotation (heavily drawn helical curve 37) of the workpiece the cut $1b$ is made with the edge 42 on the same workpiece surface, from which cut the cut $1c$ results which lies besides the cut $1b$ for the amount of pitch $T$. $1a$ and $1c$ are spaced from one another at the amount $S$. From $1c$, the helical curve 37 for the second rotation of the workpiece is again developed which means that the helical curve 37 moves forward at the amount $S$ during each rotation of the workpiece. The helical curve 37 has been identified with ordinal numbers of the workpiece rotations. (In FIG. 6, the stepwise advance of the helical curve was not identified, however, corresponds there to FIG. 9). Since with the cut $1m$ ($m \cdot S$) amount have been covered, a difference $D = (i \cdot T + S) - (m \cdot S)$ which does not evenly divide into the amount $S$ remains until the cut $1b$. If one develops from $1 m$ over $1 n$ again the helical curves 37 (from $1 n$ the helical curve of the seventh rotation [identified with $7'$]), cuts are obtained on all workpiece teeth which cuts lie at the difference $D$ besides the earlier series of cuts whereby in this exemplary embodiment, as has been stated, $D$ or $(S-D)$ does not evenly divide into $S$. Accordingly many rotations of the workpiece are required until the cuts of one series meet the cuts of a different series. Thus, the feed markings become very small or are entirely overcome.

FIGS. 10 and 11 illustrate the diagram of an exemplary embodiment in which the tool is constructed in such a manner that the workpiece must rotate twice $1'$. . . and $1''$ . . . so that a section of length $(i \cdot T) \pm S$, is covered. In such section, the surface of a given workpiece tooth is contacted twice by one edge. The first cut is identified with $1'a$, then the helical curve 45 must be developed in the diagram, as before, from the edge 46. When the workpiece has rotated once, the respective workpiece tooth contacts, after passing through the section $45'$ of the helical curve, the edge 47 which causes the cut $1''b$. After the second rotation $1''$ . . . of the workpiece (section $45''$ of the helical curve), the edge 48 cuts on the workpiece surface, the chip $1'''b$. The sequence of the cuts can, as discussed earlier, be constructed (designed) from the cuts $1''b$ and $1'''b$. It is important according to the invention that the difference $D$ does not equal $S$, preferably they do not evenly divide into one another.

In a corresponding manner tools can also be constructed according to the invention at which not only 1 or 2 rotations are required for passing through the section of length $(i \cdot T \pm S)$ but $k$ rotations whereby $k$ is any desired integer number.

Figure 14:
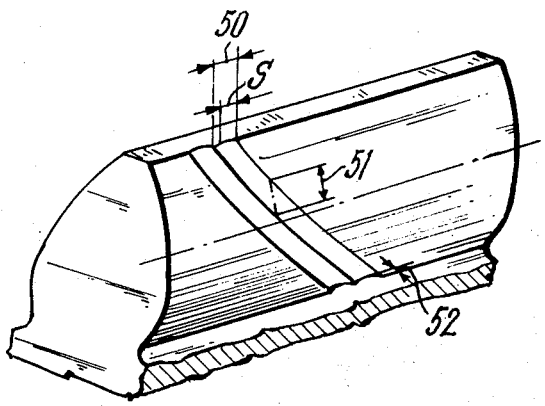
FIG. 14 illustrates a workpiece tooth with a shaving (chip) removed therefrom.

Without any further discussion one can take from FIGS. 12 and 13 that the invention can also be used to design tools in which one rotation $1'$ . . . of the workpiece will cover a longitudinal section $(i \cdot T)$ with $i$ being greater than 1, in the example equal 2, rather than $(i \cdot T)$ with $i = 1$. The relationship of the crossed-axes angle $\gamma$ to the amount $S$ when applied to the gear shaving is critical for the success of the invention. The amount $S$ depends on the width 50 (FIG. 14) of the chip (measured in direction of the tooth width). The width of the chip is calculated from the cutting stroke 51, namely from the component falling into the tooth height, of the shaving chip which as is known extends in an inclined manner from the tooth addendum to the tooth dedendum. The cutting stroke depends on the curvature radii of the tooth surfaces which act onto one another and on the depth 52 of the chip. This depth in turn depends substantially on the material, the vertical feed (radical contact pressure) and the cutting speed. The amount $S$ should be smaller according to the invention than the chip width.

These analyses have led to optimum values for the amount $S$ which are shown in a diagram (FIG. 15) in relation to the crossed-axes angle $\gamma$. Because of the plurality of the influencing values a zone which depends on the crossed-axes angle and is illustrated in FIG. 15 is valid for the optimum amount $S$. Since the radius of curvature in gears with less numbers of teeth is smaller (larger curvature of tooth surface) than in the case of gears with large numbers of teeth, for gears with low numbers of teeth the smaller values, for workpieces with high numbers of teeth the large values of the zone must be used.

The embodiments of the invention in which an exclusive property or privilege is claimed are defined as follows:

1. A gearlike tool which is suitable for working a gear by rolling and the tooth surfaces of which are provided with a plurality of grooves forming edges, which grooves are arranged following helical curves with a lead equal to one groove pitch or an integral multiple thereof on the successive teeth, characterized in that (1) an axially measured section $(i \cdot T \pm S)$ of the helical curves, which section is comprised of a groove pitch $(T)$ or an integral multiple thereof $(i \cdot T)$, with the addition or subtraction of an amount $(S)$ is measured according to a number $(Z_1$ or $k \cdot Z_1)$ of individual steps $(t)$ from tool tooth to tool tooth, said number corresponding to the number of workpiece teeth $(Z_1)$ or one integral multiple thereof ($k \cdot Z_1$), (2) that the axially measured section ($i \cdot T \pm S$) is not an integral multiple of the amount ($S$) and (3) that the entire number of teeth of the tool is an integral multiple of the groove pitch ($n \cdot T$) divided by the individual steps ($t$) from tool tooth to tool tooth.

2. Tool according to claim 1, characterized in that a sum ($m \cdot S$) of the amounts ($S$) differs from the axially measured section ($i \cdot T \pm S$) at a difference amount ($D$) which evenly divides into the amount ($S$).

3. Tool according to claim 1, characterized in that a sum ($m \cdot S$) of the amounts ($S$) differs from the section ($i \cdot T \pm S$) at a difference amount ($D$) which does not evenly divide into the amount ($S$).

4. Tool according to claim 3, characterized in that the quotient ($Z_G$, group teeth count) of the number of tool teeth ($Z_2$) and number of teeth ($n$) is not integer.

5. Tool for gear shaving at crossed axes of workpiece and tool according to claim 4, characterized in that the amount ($S$) is smaller than the cutting traces, the width of which depends on the size of the crossed-axes angle and the longitudinal sliding resulting therefrom.

6. Rotary gear shaving cutter according to claim 5, characterized in that the amount ($S$) is at a crossed-axes angle $\gamma$ of $3° = 0.02$ to $0.10$ mm. and at $15° = 0.007$ to $0.3$ mm. and that the intermediate or connecting values are interpolated or extrapolated.

* * * * *